United States Patent
Accapadi et al.

(10) Patent No.: US 7,978,731 B2
(45) Date of Patent: Jul. 12, 2011

(54) METHOD AND SYSTEM FOR CONSOLIDATING TCP PORTS

(75) Inventors: Jos Manuel Accapadi, Austin, TX (US); Kavitha Vittal Murthy Baratakke, Austin, TX (US); Nikhil Hegde, Round Rock, TX (US); Varun Sethi, Bangalore, IN (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 11/857,533

(22) Filed: Sep. 19, 2007

(65) Prior Publication Data

US 2009/0074003 A1 Mar. 19, 2009

(51) Int. Cl.
*H04J 3/16* (2006.01)
*H04J 3/24* (2006.01)

(52) U.S. Cl. .................................. 370/469; 370/489

(58) Field of Classification Search ............. 370/395.52, 370/448, 389, 469; 709/236, 223, 230
See application file for complete search history.

(56) References Cited

U.S. PATENT DOCUMENTS

| | | | |
|---|---|---|---|
| 7,392,323 B2 * | 6/2008 | Yim et al. | 709/236 |
| 2002/0010866 A1 * | 1/2002 | McCullough et al. | 713/201 |
| 2003/0188001 A1 * | 10/2003 | Eisenberg et al. | 709/229 |
| 2005/0091307 A1 | 4/2005 | Venkatsubra et al. | |
| 2006/0235939 A1 * | 10/2006 | Yim | 709/217 |
| 2007/0242696 A1 * | 10/2007 | Signaoff et al. | 370/469 |

FOREIGN PATENT DOCUMENTS

WO 2005041521 A1 5/2005

OTHER PUBLICATIONS

Stewart et al., "Stream Control Transmission Protocol", The Internet Society, Oct. 2000, RFC2960, pp. 1-126. http://www.ietf.org/rfc/rfc2960.txt.

* cited by examiner

*Primary Examiner* — Derrick W Ferris
*Assistant Examiner* — Maharishi Khirodhar
(74) *Attorney, Agent, or Firm* — Yee & Associates, P.C.; David A. Mims, Jr.

(57) ABSTRACT

A system for consolidating TCP ports. In response to initiating a connection to a hidden port via a network, a TCP in TCP packet is created. Then, the TCP in TCP packet is sent to the hidden port via the network via a network visible port.

17 Claims, 3 Drawing Sheets

METHOD AND SYSTEM FOR CONSOLIDATING TCP PORTS

BACKGROUND OF THE INVENTION

1. Field of the Invention

The present invention relates generally to an improved data processing system. More specifically, the present invention is directed to a computer implemented method, system, and computer usable program code for encapsulating transmission control protocol in transmission control protocol to consolidate transmission control protocol ports.

2. Description of the Related Art

Today, most computers are connected to some type of network. A network allows a computer to share information with other computer systems. The Internet is one example of a computer network. The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. Typically, the Internet uses a set of protocols called Transmission Control Protocol/Internet Protocol (TCP/IP).

Using transmission control protocol (TCP), applications on networked hosts may create connections to one another, over which they may exchange streams of data using stream sockets. TCP guarantees reliable and in-order delivery of data from sender to receiver. Also, TCP distinguishes data for multiple connections by concurrent applications, such as, for example, a Web server and an e-mail server, running on the same host.

TCP checks to make sure that no packets are lost during transmission by giving each packet a sequence number, which is also used to make sure that the data is delivered to the entity at the other end in the correct order. The TCP module at the receiving end sends back an acknowledgement for packets which have been successfully received. A timer at the sending TCP will cause a timeout if an acknowledgement is not received within a reasonable round-trip time. Lost data is then re-transmitted.

In addition, TCP checks that no bytes are corrupted during transmission by using a checksum. A checksum is computed at the sender for each block of data before the data is transmitted. Then, the checksum is checked at the receiver to make sure the data is the same.

A port number is a special number present in a header of a data packet. Port numbers are typically used to map data to a particular process running on a computer. In TCP, each packet header will specify a source port number and a destination port number, as well as specifying the source and destination IP addresses among other things. A process may "bind" to a particular port to send and receive data. Binding to a particular port means that the process will listen for incoming packets whose destination port matches that port number and/or send outgoing packets whose source port is set to that port number.

Because the port number forms part of the packet header, the port number is readily interpreted not only by the sending and receiving computers, but also by other aspects of the networking infrastructure. In particular, firewalls are commonly configured to respond differently to packets depending on their source and/or destination port numbers. In other words, a firewall may allow certain port numbers to pass through the firewall, while preventing other port numbers from passing through.

Processes implement connections to TCP ports by means of sockets. A socket is a transport end-point, which a process may create and then bind to a socket address. In TCP, a socket address consists of a combination of a port and an IP number.

Current systems require that each port used for every TCP connection must be enabled in the firewall. Enabling each port for every TCP connection creates multiple "punchthroughs" in the firewall. Punchthrough or hole punching is a technique to establish communication between two devices that are behind one or more restrictive firewalls. Creating multiple punchthroughs in the firewalls creates an increased security risk to any system.

Typically, clients have setups where they have multiple ports in use for multiple TCP connections. Specifically, clients need setups where multiple ports have to be in use because other clients may connect to the clients to retrieve data from the server instead of the other clients directly connecting to the server due to security issues. A problem with this type of setup is that multiple ports are enabled in the firewall, which may prove to be a high security risk. Ideally, clients want to open as few ports as possible in the firewall for increased security purposes.

A present solution to this type of problem is to intercept a request to connect to a "hidden" port and store a mapping between the "network visible" port and the hidden port. Then, the request is redirected to the hidden port via the stored mapping. A problem with this solution is that it involves increased overhead for rewriting protocol headers and recalculating checksums.

Another current solution is to use a "TCP tunnel" where all connections are made to one or more local ports. Then, those connections are forwarded to the other end, which may possibly be through a firewall, via a single TCP port. An application at this single port gathers all the data from various different ports and tunnels them through a single connection. A problem with this solution is that the application at the single port becomes a single point of failure. Also, congestion may occur because the rate of service is dependent on the rate at which this application may process data from various different connections feeding into it.

Therefore, it would be beneficial to have an improved computer implemented method, system, and computer usable program code for multiplexing multiple TCP connections onto a single connection by encapsulating TCP in TCP to consolidate TCP ports, thus enabling only one open port in the firewall for increased network security.

SUMMARY OF THE INVENTION

Illustrative embodiments provide a computer implemented method, system, and computer usable program code for consolidating TCP ports. In response to initiating a connection to a hidden port via a network, a TCP in TCP packet is created. Then, the TCP in TCP packet is sent to the hidden port via the network via a network visible port.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
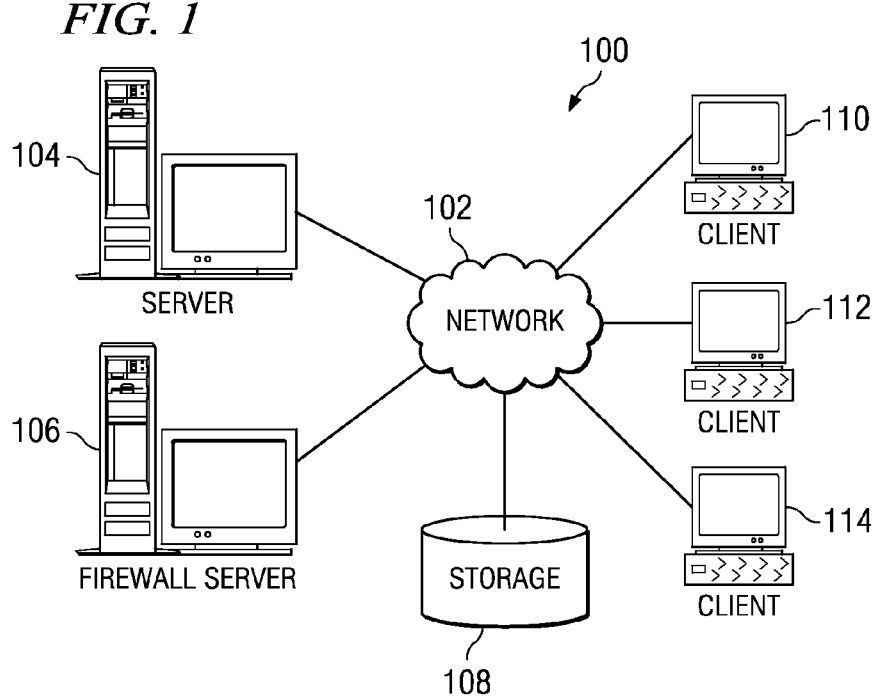
FIG. 1 is a pictorial representation of a network of data processing systems in which illustrative embodiments may be implemented.
Figure 2:
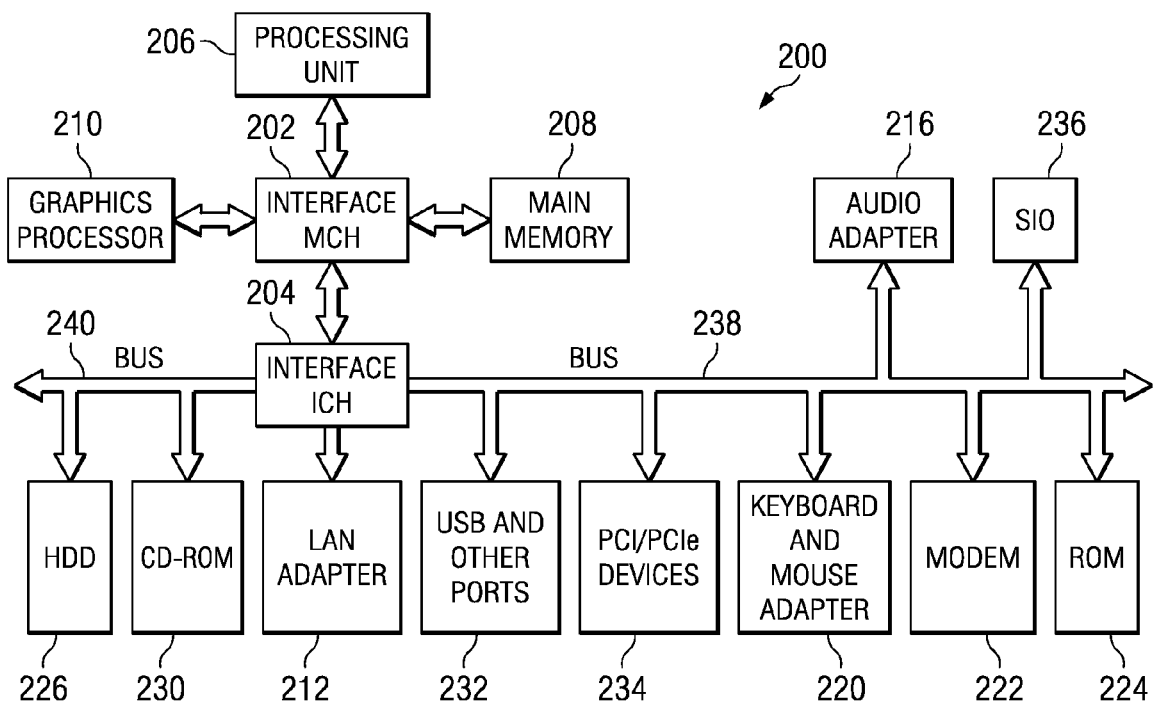
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 also connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Further, server 106 is a firewall server. Server 104 may, for example, be located "behind" firewall server 106. In other words, all network traffic directed to server 104 must first pass through server 106. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface/MCH 202. Processing unit 206 may contain one or more processors and even may be implemented using one or more heterogeneous processor systems. Graphics processor 210 may be coupled to interface/MCH 202 through an accelerated graphics port (AGP), for example.

In the depicted example, local area network (LAN) adapter 212 is coupled to interface/ICH 204 and audio adapter 216, keyboard and mouse adapter 220, modem 222, read only memory (ROM) 224, universal serial bus (USB) and other ports 232, and PCI/PCIe devices 234 are coupled to interface/ICH 204 through bus 238, and hard disk drive (HDD) 226 and CD-ROM 230 are coupled to interface/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™. Microsoft and Windows Vista are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface/MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for consolidating TCP ports. A user, such as, a system administrator, configures a client application with a network visible port number, which is provided by a server. A TCP in TCP handler in an operating system kernel creates a TCP in TCP packet in response to the client application initiating a connection to a hidden port on a server via a network. It should be noted that the TCP in TCP handler is located in both the server and the client. The TCP in TCP handler at the sending device multiplexes a plurality of TCP connections onto a single connection by encapsulating TCP in TCP. Conversely, the TCP in TCP handler at the receiving device de-multiplexes the single connection on to a plurality of TCP connections.

The TCP in TCP packet includes an outer TCP header and an inner TCP header. The inner TCP header is encapsulated in the outer TCP header. The outer TCP header includes source/destination ports for corresponding network visible ports and the inner TCP header includes source/destination ports for corresponding hidden ports. The inner TCP header containing the hidden ports determines the final destination of the TCP in TCP packet, which is, for example, an application socket.

The network includes one or more intervening firewalls between the server and the client. Only one network visible port is open on the one or more firewalls for increased network security purposes. The TCP in TCP packet passes through the one or more intervening firewalls in the network because the outer TCP header includes the open network visible port number.

The client sends the TCP in TCP packet to the hidden port via the network visible port. An IP layer of the receiving device passes the TCP in TCP packet to the TCP in TCP handler based on an identification field in an IP header of the TCP in TCP packet. The identification field identifies the packet as a TCP in TCP packet.

Consequently, illustrative embodiments enable only one port in the firewall by multiplexing multiple TCP connections onto a single connection. Thus, illustrative embodiments utilize a single punchthrough in the firewall by employing TCP port consolidation. As a result, illustrative embodiments minimize the number of punchthroughs in the firewall, which provides significant security benefits to the data processing system. In addition, illustrative embodiments decrease overhead by eliminating checksum recalculating and protocol header rewriting.

Also, tunneling in illustrative embodiments is logical rather than real as in case of TCP tunnel, thus providing a potentially infinite tunnel size. Tunneling is a technique for encapsulating one network protocol inside another network protocol. Encapsulation is the basis of networking. For example, HTTP is encapsulated by TCP, TCP is encapsulated by IP, and IP is usually encapsulated in Ethernet.

The IP layer, which normally passes a packet to the appropriate handler based on the next protocol field, may pass this new type of TCP in TCP packet to a TCP in TCP handler. The TCP in TCP handler may locate the connection information using the outer TCP header as usual. The outer TCP header contains the network visible source and destination ports. Then, the TCP in TCP handler may also process the inner TCP header to determine the ultimate packet destination that may be an application socket. The inner TCP header contains the hidden port at which the application is waiting to receive data or send data.

In addition, the sequence number and acknowledgement number may be maintained on a per-port basis, even though a single physical connection is being maintained. Using sequence and acknowledgement numbers on a per-port basis provides the concept of multiple sub-connections within a single TCP physical connection, which may have logically independent flows. Logically independent flows further provide a big advantage by eliminating head of the line blocking encountered in TCP protocol where a lost data packet may prevent delivery of succeeding data packets, even though these succeeding data packets are "logically" not dependent on the lost data packet. Because these hidden ports act like sub-connections within the single TCP physical connection, these sub-connections may provide independent flows with logically independent sequence numbers.

Therefore, illustrative embodiments by using TCP in TCP encapsulation minimize security risk at firewalls without rewriting headers and recalculating checksums. Further, illustrative embodiments provide logical sub-connections without the overhead of multiple TCP connection maintenance and without rewriting applications to use new protocols. Furthermore, illustrative embodiments eliminate the single point of failure/congestion as seen with current TCP tunneling methods.

Figure 3:
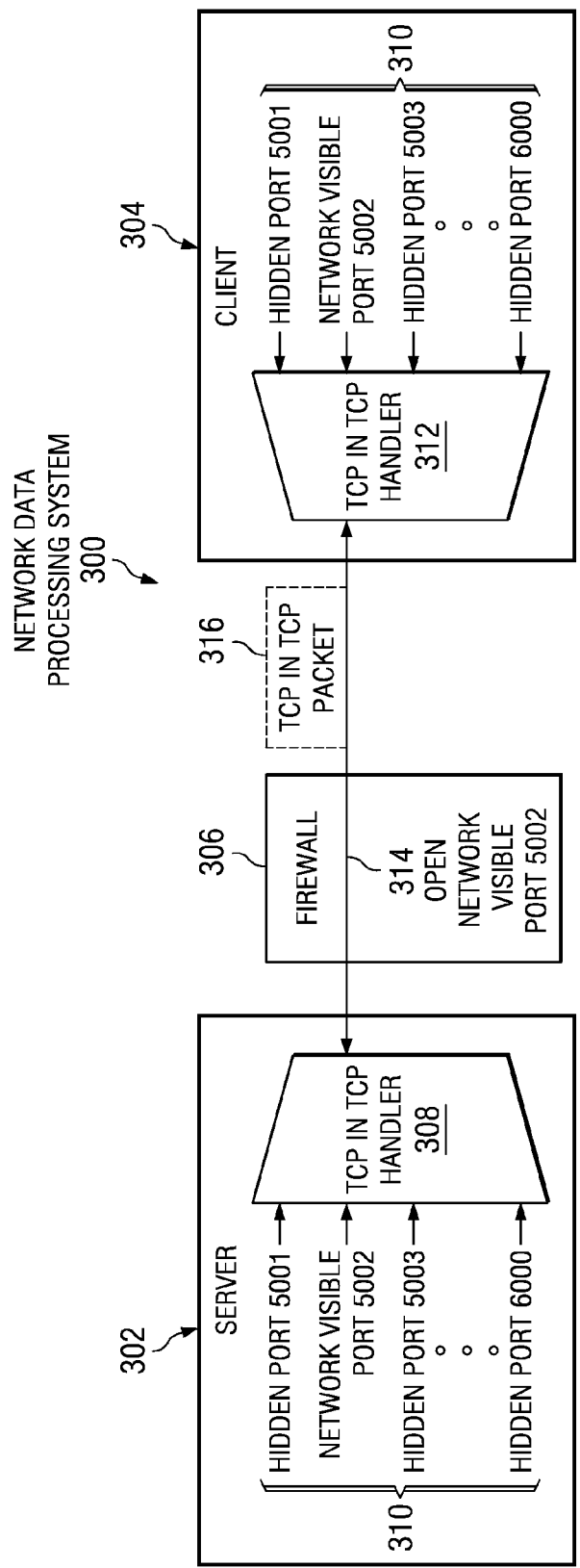
FIG. 3 is a block diagram illustrating consolidation of TCP ports between a server device and a client device with an intervening firewall in accordance with an illustrative embodiment.

With reference now to FIG. 3, a block diagram illustrating consolidation of TCP ports between a server device and a client device with an intervening firewall is depicted in accordance with an illustrative embodiment. Network data processing system 300 may for example be implemented in network data processing system 100 in FIG. 1. Network data processing system 300 includes server 302, client 304, and firewall 306, such as server 104, client 110, and firewall server 106 in FIG. 1.

Server 302 includes TCP in TCP handler 308. TCP in TCP handler 308 may, for example, be implemented in an operating system kernel within server 302. However, it should be noted that TCP in TCP handler 308 may be implemented in any appropriate component within server 302 that is capable of performing processes of illustrative embodiments or may be implemented as a stand-alone component. TCP in TCP handler 308 multiplexes multiple TCP connections onto a single connection by creating TCP in TCP packets that include outer and inner TCP headers.

Outer TCP headers contain network visible port numbers, while encapsulated inner TCP headers contain hidden port numbers. Server 302 and client 304 use the network visible port numbers to establish an actual TCP connection. A TCP connection consists of two endpoints defined by a four-tuple. The four-tuple is a source IP address, source port number, destination IP address, and destination port number. A network visible port is one of the ports that are a part of the four-tuple.

The hidden port is not visible to a TCP handler, but only to TCP in TCP handler 308. TCP in TCP handler 308 uses the hidden port number to de-multiplex the incoming data and deliver the de-multiplexed data to the appropriate application socket based on the hidden port number associated with the data. An application using TCP in TCP binds to the hidden port, but the underlying TCP connection is made using the network visible port. A system administrator defines a mapping between the hidden and network visible ports based on the configuration of firewall 306.

Server 302 also includes a plurality of processes represented by network visible and hidden ports 310. Network visible and hidden ports 310 include hidden port 5001, network visible port 5002, and hidden ports 5003 through 6000. However, it should be noted that these network visible and hidden port numbers are only meant for exemplary purposes and are not limitations to illustrative embodiments. Illustrative embodiments may utilize any port numbers available within a network.

Client 304 includes TCP in TCP handler 312. TCP in TCP handler 312 is similar to TCP in TCP handler 308 in form and function. In other words, TCP handler 312 in client 304 performs a similar function as TCP in TCP handler 308 in server 302. Client 304 also includes plurality of processes 310 represented by hidden port 5001, network visible port 5002, and hidden ports 5003 through 6000.

Firewall 306 is a firewall that intervenes between server 302 and client 306 for security purposes. In addition, firewall 306 may represent more than one firewall. In this illustrative example, firewall 306 is configured so that only one network visible port, such as open network visible port 5002 314, is open for network traffic. In other words, firewall 306 only allows packets with network visible port number 5002 to pass through it, while blocking all other port numbers. Thus, firewall 306 only maintains one network connection through it between server 302 and client 304. As a result, server 302 and client 304 create and transmit TCP in TCP packet 316 with an outer TCP header that includes network visible port number 5002. The inner TCP header within TCP in TCP packet 316 includes a hidden port number, such as hidden port numbers 5001, 5003, . . . 6000.

Figure 4:
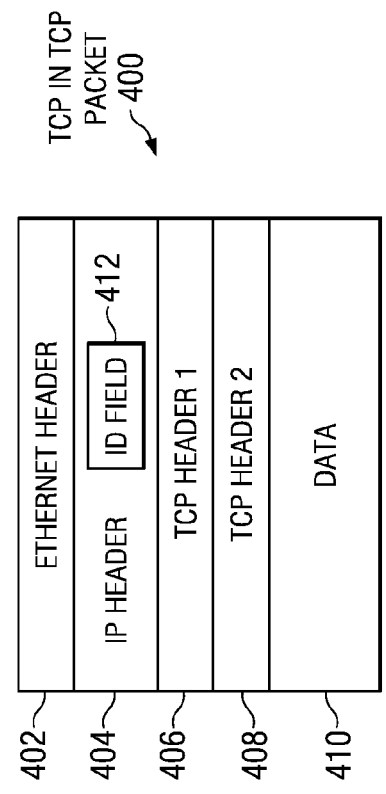
FIG. 4 is an exemplary illustration of TCP in TCP encapsulation for TCP port consolidation in accordance with an illustrative embodiment.

With reference now to FIG. 4, an exemplary illustration of TCP in TCP encapsulation for TCP port consolidation is depicted in accordance with an illustrative embodiment. TCP in TCP packet 400 may, for example, be TCP in TCP packet 316 in FIG. 3. TCP in TCP packet 400 includes Ethernet header 402, IP header 404, TCP header 1 406, TCP header 2 408, and data 410. However, it should be noted that TCP in TCP packet 400 may include more or fewer headers depending upon implementation.

Ethernet header 402 is used to direct TCP in TCP packet 400 to the correct network. IP header 404 is used to direct TCP in TCP packet 400 to the correct device within the network. IP header 404 includes identification (ID) field 412. ID field 412 is a protocol identifier that indicates the transport/higher layer protocol the packet is intended for, such as in this case a TCP in TCP layer. In other words, ID field 412 identifies TCP in TCP packet 400 as a TCP in TCP packet so that the IP layer may pass TCP in TCP packet 400 to a TCP in TCP handler, such as TCP in TCP handler 308 in FIG. 3, for proper processing.

TCP header 1 406 is the outer TCP header of TCP in TCP packet 400. TCP header 1 406 includes source and destination port numbers that correspond to the network visible port number to establish the connection. TCP header 2 408 is the inner TCP header of TCP in TCP packet 400. TCP header 2 408 includes source and destination port numbers that correspond to the hidden port number for routing to the appropriate application socket. Data 410 may represent any type data.

TCP in TCP packet 400 may also include other information, such as sequence number, acknowledgement number, window size, flags, checksum, urgent pointer, etc. In addition, the sequence and acknowledgement numbers may be maintained on a per-port basis, even though a single physical connection is being maintained. Using sequence and acknowledgement numbers on a per-port basis provides multiple sub-connections within a single TCP physical connection, which may have logically independent flows.

Figure 5:
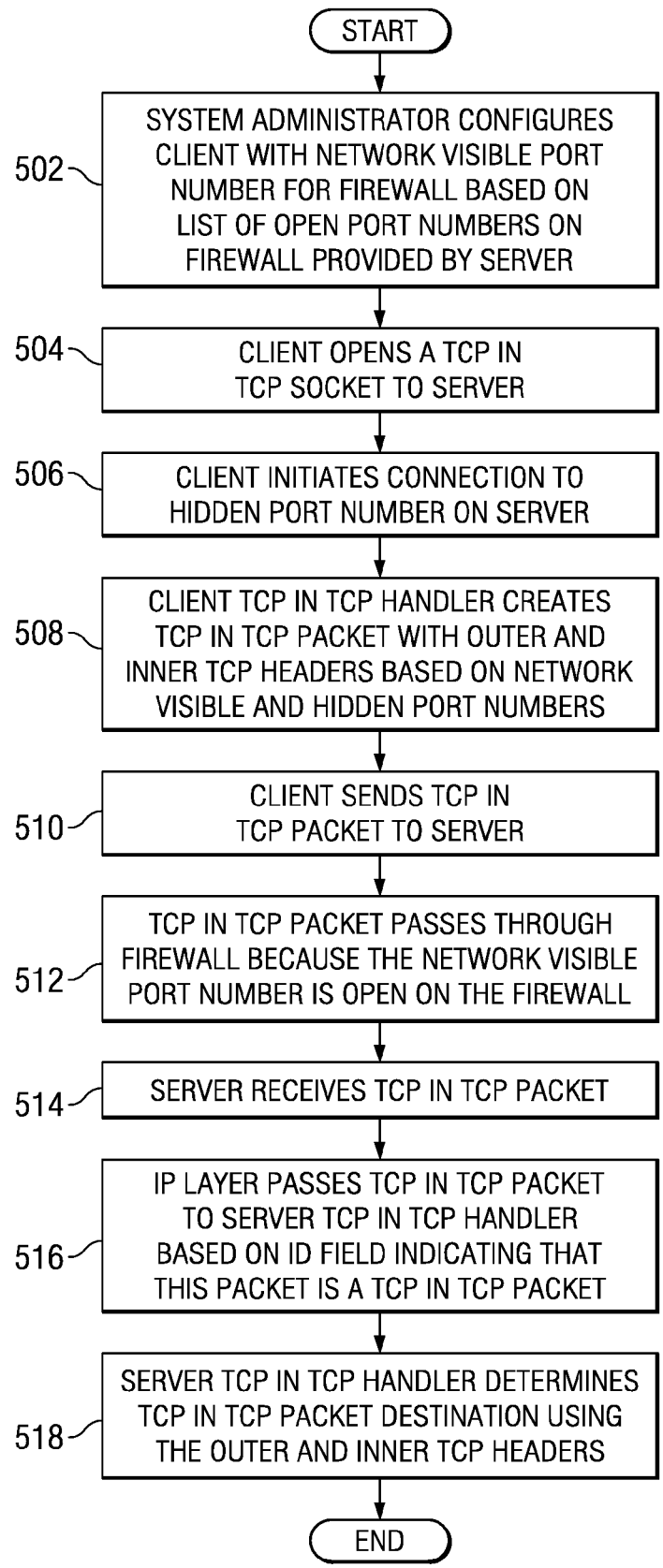
FIG. 5 is a flowchart illustrating an exemplary process for consolidating TCP ports in accordance with an illustrative embodiment.

With reference now to FIG. 5, a flowchart illustrating an exemplary process for consolidating TCP ports is shown in accordance with an illustrative embodiment. The process shown in FIG. 5 may be implemented in a data processing system, such as, for example, data processing system 300 in FIG. 3.

The process begins when a system administrator or user configures a client, such as client 304 in FIG. 3, with a network visible port number for a firewall, such as firewall 306 in FIG. 3, based on a list of open port numbers on the firewall provided by a server, such as server 302 in FIG. 3 (step 502). After being configured with the network visible port number, the client opens a TCP in TCP socket to the server (step 504). Opening the TCP in TCP socket tells the client operating system that a connection is to be initiated to the server. Then, the client initiates the connection to a hidden port number on the server (step 506).

Subsequently, the client TCP in TCP handler in the operating system kernel creates a TCP in TCP packet, such as TCP in TCP packet 400 in FIG. 4 (step 508). The TCP in TCP packet includes an outer TCP header, such as TCP header 1 406 in FIG. 4, which includes a network visible port number and an inner TCP header, such as TCP header 2 408 in FIG. 4, which includes a hidden port number. After the TCP in TCP handler creates the TCP in TCP packet in step 508, the client sends the TCP in TCP packet, such as TCP in TCP packet 316 in FIG. 3, to the server via a network, such as network 102 in FIG. 1 (step 510).

Subsequent to the client sending the TCP in TCP packet to the server, the TCP in TCP packet passes through the firewall on the way to the server because the network visible port number is open on the firewall, such as open network visible port 5002 314 in FIG. 3 (step 512). Then, the server receives the TCP in TCP packet (step 514). An IP layer in the server passes the TCP in TCP packet to the server TCP in TCP handler based on an ID field in the IP header, such as ID field 412 in IP header 404 in FIG. 4, which identifies this packet as a TCP in TCP packet (step 516). Then, the server TCP in TCP handler determines the final destination of the TCP in TCP packet using the outer and inner TCP headers (step 518). The process terminates thereafter.

However, it should be noted that the server may respond to client requests in a similar fashion. In other words, the server uses a similar method to transmit TCP in TCP packets back to the client through the firewall. In addition, the server may open a TCP in TCP listener socket at the hidden port that is mapped to the network visible port, which is open on the firewall.

Thus, illustrative embodiments provide a computer implemented method, system, and computer usable program code for multiplexing multiple TCP connections onto a single connection by encapsulating TCP in TCP to consolidate TCP ports, thus enabling only one open port in the firewall. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer or any other instruction execution system. For the purposes of this description, a computer-usable or computer readable storage medium can be any tangible apparatus that can contain the program for use by or in connection with the instruction execution system, apparatus, or device.

The non-transitory storage medium can be an electronic, or semiconductor system (or apparatus or device). Examples of a computer-usable or computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and Digital Video/Versatile Disk (DVD).

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing device for consolidating TCP ports, the computer implemented method comprising:
responsive to initiating a connection to a hidden port within a plurality of hidden ports via a network, creating by a processing device communicatively coupled to the data processing device a TCP in TCP packet that includes sequence and acknowledgement numbers on a per-port basis to provide logically independent data transmission flows for each hidden port within the plurality of hidden ports; and
sending by the data processing device the TCP in TCP packet to the hidden port via the network via a network visible port, wherein the data processing system sends the TCP in TCP packet without recalculating checksums, and wherein the network includes a firewall that has the network visible port as the only open port on the firewall, and wherein an IP layer passes the TCP in TCP packet to a TCP in TCP handler based on an identification field in an IP header of the TCP in TCP packet that identifies the TCP in TCP packet.

2. The computer implemented method of claim 1, further comprising:
configuring a client device with the network visible port.

3. The computer implemented method of claim 1, wherein the TCP in TCP handler creates the TCP in TCP packet.

4. The computer implemented method of claim 1, wherein the TCP in TCP handler is implemented in an operating system kernel.

5. The computer implemented method of claim 1, wherein the TCP in TCP handler is located in a server device and a client device.

6. The computer implemented method of claim 1, wherein the TCP in TCP handler multiplexes a plurality of TCP connections onto a single connection by encapsulating TCP in TCP.

7. The computer implemented method of claim 1, wherein the TCP in TCP packet includes an outer TCP header and an inner TCP header, and wherein the inner TCP header is encapsulated in the outer TCP header.

8. The computer implemented method of claim 7, wherein the outer TCP header includes source/destination ports for corresponding network visible ports, and wherein the inner TCP header includes source/destination ports for corresponding hidden ports.

9. The computer implemented method of claim 8, wherein the inner TCP header containing the corresponding hidden ports determines a final destination of the TCP in TCP packet, and wherein the final destination of the TCP in TCP packet is an application socket.

10. The computer implemented method of claim 1, wherein the sequence and acknowledgement numbers on the per-port basis provide multiple sub-connections within a single TCP physical connection.

11. The computer implemented method of claim 1, wherein the network visible port is used to establish a TCP connection, and wherein the hidden port is only visible to the TCP in TCP handler.

12. The computer implemented method of claim 11, wherein the TCP in TCP handler uses the hidden port to de-multiplex incoming data to form de-multiplexed data and deliver the de-multiplexed data to an appropriate process.

13. A data processing system for consolidating TCP ports, comprising:
a bus system;
a storage device connected to the bus system, wherein the storage device includes a set of instructions; and
a processing unit connected to the bus system, wherein the processing unit executes the set of instructions to create a TCP in TCP packet that includes sequence and acknowledgement numbers on a per-port basis to provide logically independent data transmission flows for each hidden port within a plurality of hidden ports in response to initiating a connection to a hidden port within the plurality of hidden ports via a network and send the TCP in TCP packet to the hidden port via the network via a network visible port, wherein the data processing system sends the TCP in TCP packet without recalculating checksums, and wherein the network includes a firewall that has the network visible port as the only open port on the firewall, and wherein an IP layer passes the TCP in TCP packet to a TCP in TCP handler based on an identification field in an IP header of the TCP in TCP packet that identifies the TCP in TCP packet.

14. The data processing system of claim 13, wherein the processing unit executes a further set of instructions to configure a client device with the network visible port.

15. A computer program product stored in a non-transitory computer usable storage medium having computer usable program code embodied therein for consolidating TCP ports, the computer program product comprising:

computer usable program code configured to create a TCP in TCP packet that includes sequence and acknowledgement numbers on a per-port basis to provide logically independent data transmission flows for each hidden port within a plurality of hidden ports in response to initiating a connection to a hidden port within the plurality of hidden ports via a network; and computer usable program code configured to send the TCP in TCP packet to the hidden port via the network via a network visible port, wherein a data processing system sends the TCP in TCP packet without recalculating checksums, and wherein the network includes a firewall that has the network visible port as the only open port on the firewall, and wherein an IP layer passes the TCP in TCP packet to a TCP in TCP handler based on an identification field in an IP header of the TCP in TCP packet that identifies the TCP in TCP packet.

16. The computer program product of claim 15, further comprising:

computer usable program code configured to configure a client device with the network visible port.

17. The computer program product of claim 15, wherein the TCP in TCP handler creates the TCP in TCP packet.

* * * * *